(12) United States Patent
Alberkrack et al.

(10) Patent No.: US 7,538,505 B2
(45) Date of Patent: May 26, 2009

(54) NOISE SUPPRESION SUPPRESSION FOR HALL SENSOR ARRANGEMENTS

(76) Inventors: Jade H. Alberkrack, 1834 E. Calle De Caballos, Tempe, AZ (US) 85284; Robert Alan Brannen, 900 N. Rural Rd., Apt. 1018, Chandler, AZ (US) 85226; Thomas Peter Bushey, 10440 E. Dennis St., Mesa, AZ (US) 86207

( * ) Notice: Subject to any disclaimer, the term of this patent is extended or adjusted under 35 U.S.C. 154(b) by 206 days.

(21) Appl. No.: 11/799,331

(22) Filed: May 1, 2007

(65) Prior Publication Data
US 2008/0273865 A1 Nov. 6, 2008

(51) Int. Cl.
*H02P 6/06* (2006.01)

(52) U.S. Cl. ............ 318/400.01; 318/700; 318/400.13; 318/400.14

(58) Field of Classification Search ................. 318/138, 318/400.01, 400.1, 400.13, 400.14, 700; 388/800, 806, 811
See application file for complete search history.

(56) References Cited

U.S. PATENT DOCUMENTS

| 7,259,531 | B1* | 8/2007 | Liu ....................... 318/400.38 |
| 7,262,570 | B2* | 8/2007 | Alberkrack et al. .... 318/400.38 |
| 7,276,867 | B2* | 10/2007 | Alberkrack et al. .... 318/400.24 |
| 7,443,119 | B2* | 10/2008 | Liu ....................... 318/400.01 |
| 2006/0238154 | A1* | 10/2006 | Brannen et al. ............. 318/439 |
| 2008/0252239 | A1* | 10/2008 | Lin et al. ................ 318/400.06 |

* cited by examiner

*Primary Examiner*—Bentsu Ro
*Assistant Examiner*—Thai Dinh
(74) *Attorney, Agent, or Firm*—Knobbe Martens Olsons & Bear LLP

(57) ABSTRACT

A method and apparatus is provided for processing signals from a Hall effect device arrangement coupled to a monolithic brushless DC motor where the motor is driven by a PWM circuit providing PWM drive signals.

13 Claims, 5 Drawing Sheets

US 7,538,505 B2

NOISE SUPPRESION SUPPRESSION FOR HALL SENSOR ARRANGEMENTS

FIELD OF THE INVENTION

The invention pertains to motor drive and control circuits, in general, and to direct current motor circuits utilizing Pulse Width Modulation (PWM) motor drive and that utilize Hall effect device sensors arrangements, in particular.

BACKGROUND OF THE INVENTION

Monolithic brushless DC motors are increasingly utilized as fan motors is various computer applications. Pulse width modulation drive circuits are commonly used in conjunction with control circuits to control the speed of such fan motors.

In some applications, Hall effect type sensors and amplifiers are utilized to generate signals to determine the rotational position and speed of the motor.

One problem that occurs when utilizing Hall effect type sensors in conjunction with PWM driven motors is that the leading and trailing edges of each pulse of the PWM signals induces a noise spike in the Hall sensor outputs.

SUMMARY OF THE INVENTION

In accordance with the principles of the invention, an improved arrangement is provided that suppresses PWM caused noise in the signal produced by Hall effect device sensor arrangements.

Further in accordance with the principles of the invention, a method of processing signals from a Hall effect device arrangement coupled to a monolithic brushless DC motor where the motor is driven by a PWM circuit providing PWM drive signals is provided. The method comprises the steps of: receiving signals from the Hall effect device arrangement; providing output signals levels at an output node that correspond to output signal levels from the Hall effect device arrangement; providing first PWM signals that precede the PWM drive signals by a first predetermined time period; detecting edges of the first PWM signals; and holding the signal level at the output node at its existing level for a predetermined time duration upon detection of each edge of the first PWM signals.

Still further in accordance with the principles of the invention, the predetermined time duration is selected to correspond to the sum of the predetermined time period and the time period during which transient noise appears on the Hall effect device arrangement output signals.

Yet further in accordance with the invention, a motor circuit is provided for use with a monolithic brushless DC motor having a Hall effect device arrangement coupled to the monolithic brushless DC motor. The Hall effect device arrangement provides signals indicative of the rotational position and speed of the motor. The motor circuit comprises a sampling circuit having one or more input nodes coupled to the Hall effect device arrangement, a sample control input node, and an output node. The motor circuit includes a motor drive PWM circuit that has a first output node and second output nodes coupleable to the motor. The PWM circuit provides a first PWM signal at the first output nodes and second PWM signals at the second output nodes. The first PWM signal precedes the second PWM signals by a predetermined first time period. The motor circuit includes an edge detector circuit having an input node coupleable to the PWM circuit first output node to receive the first PWM signal. The edge detector circuit has an output node, and the edge detector provides an edge indicating signal at the output node whenever the first PWM signal transitions between two states. A pulse generating circuit has an input node coupled to the edge detector circuit output node. The pulse generating circuit has an output node and is responsive to each edge indicating signal to provide a pulse signal at the output node. The pulse signal has a predetermined time duration selected to be greater than the predetermined first time period and the time period of noise spikes generated by the second PWM signals. The output node of the pulse generating circuit is coupled to the sampling circuit sample control input node. The sampling circuit provides an output signal at the output node having a level that follows the signal level at the sampling circuit input node. The sampling circuit holds the signal level at the output node during the time duration that the pulse signal is present at the sample control input node.

Still further in accordance with the invention, a single substrate is provided comprising the sampling circuit, the edge detector circuit, and the pulse generating circuit formed thereon.

Even further in accordance with the invention, the single substrate further comprises the motor drive PWM circuit formed thereon.

BRIEF DESCRIPTION OF THE DRAWING

The invention will be better understood from a reading of the following detailed description of a preferred embodiment of the invention in conjunction with the drawing figures in which like reference designations are utilized to designate like elements, and in which.

DETAILED DESCRIPTION

Figure 1:
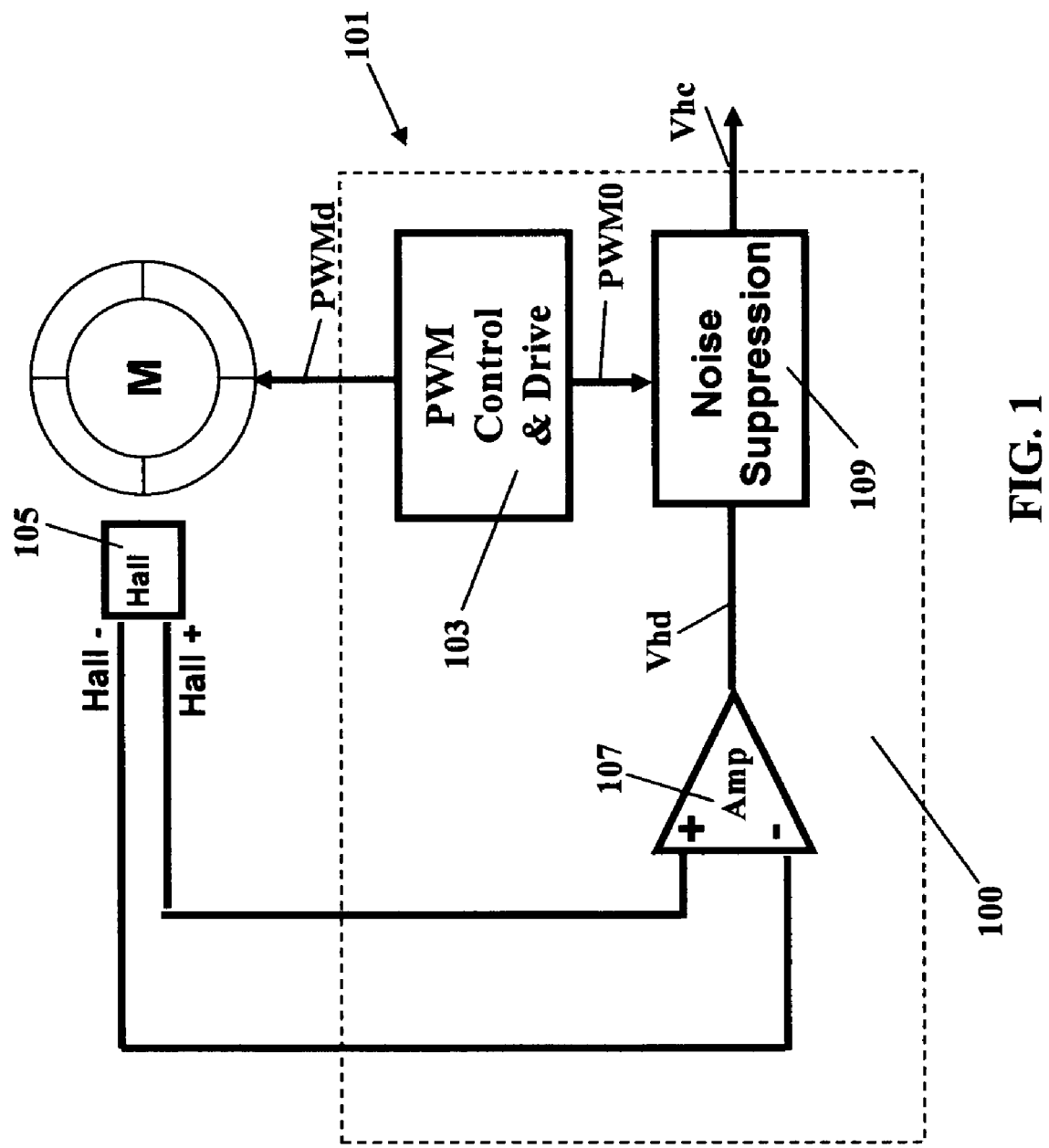
FIG. 1 illustrates a system in accordance with the invention.

Turning now to FIG. 1, a direct current brushless motor M is driven by integrated motor control and drive circuit 101. Circuit 101 in the illustrative embodiment, is formed on a single chip or substrate 100. Circuit 101 is an integrated circuit motor controller of the type utilized to control fans or other types of motors in applications in which power management is of concern. Circuit 101 includes circuitry to provide all required functions for implementing fan speed control. Circuit 101 includes a PWM motor control and drive circuit 103 that includes a fixed frequency oscillator, a comparator and a latch for speed control, commutation logic for proper drive sequencing, and on-chip power MOSFETs for direct motor drive.

Associated with motor M is a Hall effect sensor 105 that provides an output signal, the output frequency of which is directly dependent on and which correlates to the rotational speed of motor M. The output leads Hall+ and Hall− of sensor 105 are connected to a Hall sensor amplifier 107. Hall effect sensor 105 and Hall sensor amplifier 107 are collectively and separately referred to herein as a 'Hall arrangement'.

Figure 2:
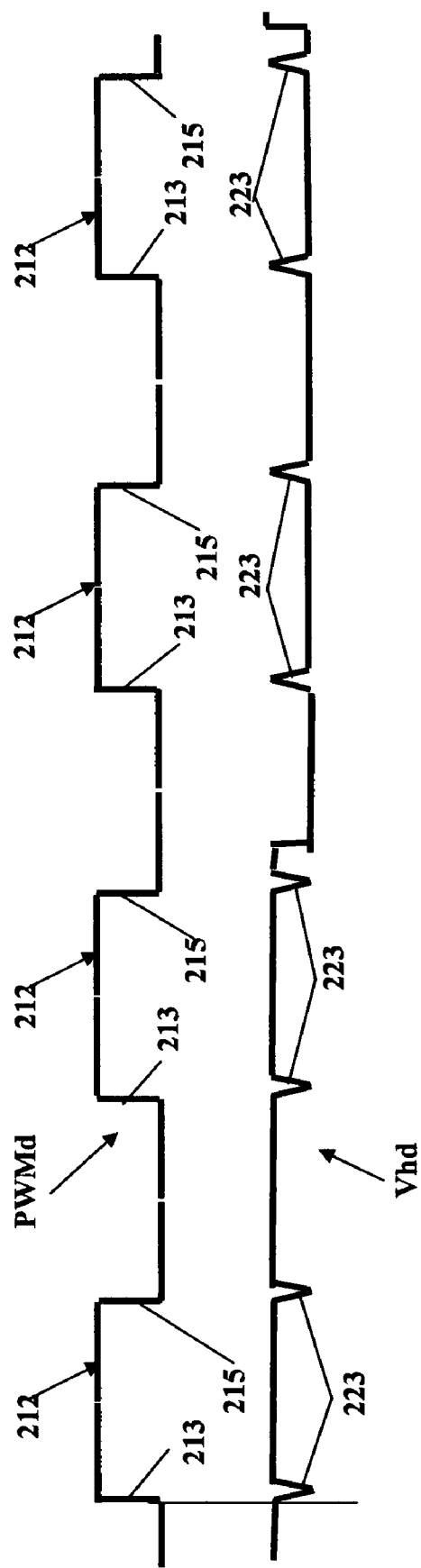
FIG. 2 illustrates selected voltage waveforms produced in the system of FIG. 1.

Turning now to FIG. 2, waveform PWMd is the waveform of the PWM signal from PWM control and drive circuit 103 that drives motor M. Waveform Vhd is the waveform at the output of Hall amplifier 107. Waveform PWMd produces noise in motor M that is picked up on the output of Hall sensor 105 and appears at the output of Hall amplifier 107. The noise is caused by the edge transitions 213, 215 of the PWM waveform PWMd. The resulting noise appears at the output of Hall amplifier 107 as noise spikes 223 in the waveform Vhd.

Turning back to FIG. 1, a noise suppression circuit 109 is provided in accordance with the principles of the invention to provide an output signal Vhc which tracks the Hall arrangement output signal without PWM induced noise. Noise suppression circuit 109 is included on the same integrated circuit 100 that includes PWM control and drive circuit 103 and hall amplifier 107. As will be appreciated by those skilled in the art, noise suppression circuit 109 may be provided as a separate integrated circuit or may be included on an integrated circuit that includes other circuitry.

Figure 3:
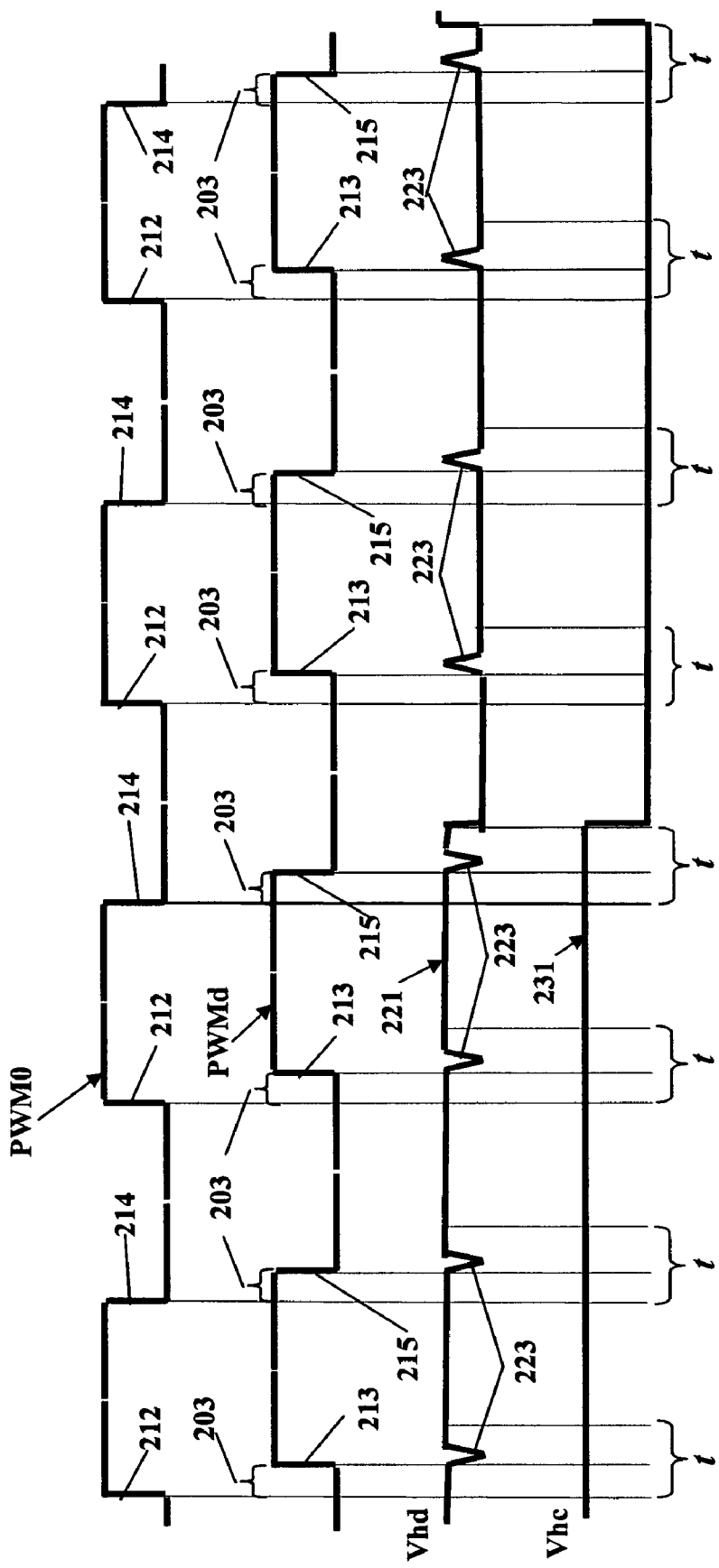
FIG. 3 illustrates voltage waveforms of FIG. 2 and additional waveforms produced in the system of FIG. 1.

FIG. 3 illustrates how the apparatus and method of the present invention provides an output signal that has PWM induced noise spikes eliminated from an output signal that correlates to the output of the Hall sensor arrangement comprised of Hall sensor 105 and Hall amplifier 107. A signal PWM0 is provided by circuit 103. Signal PWM0 precedes signal PWMd by a predetermined first time period 203.

Figure 4:
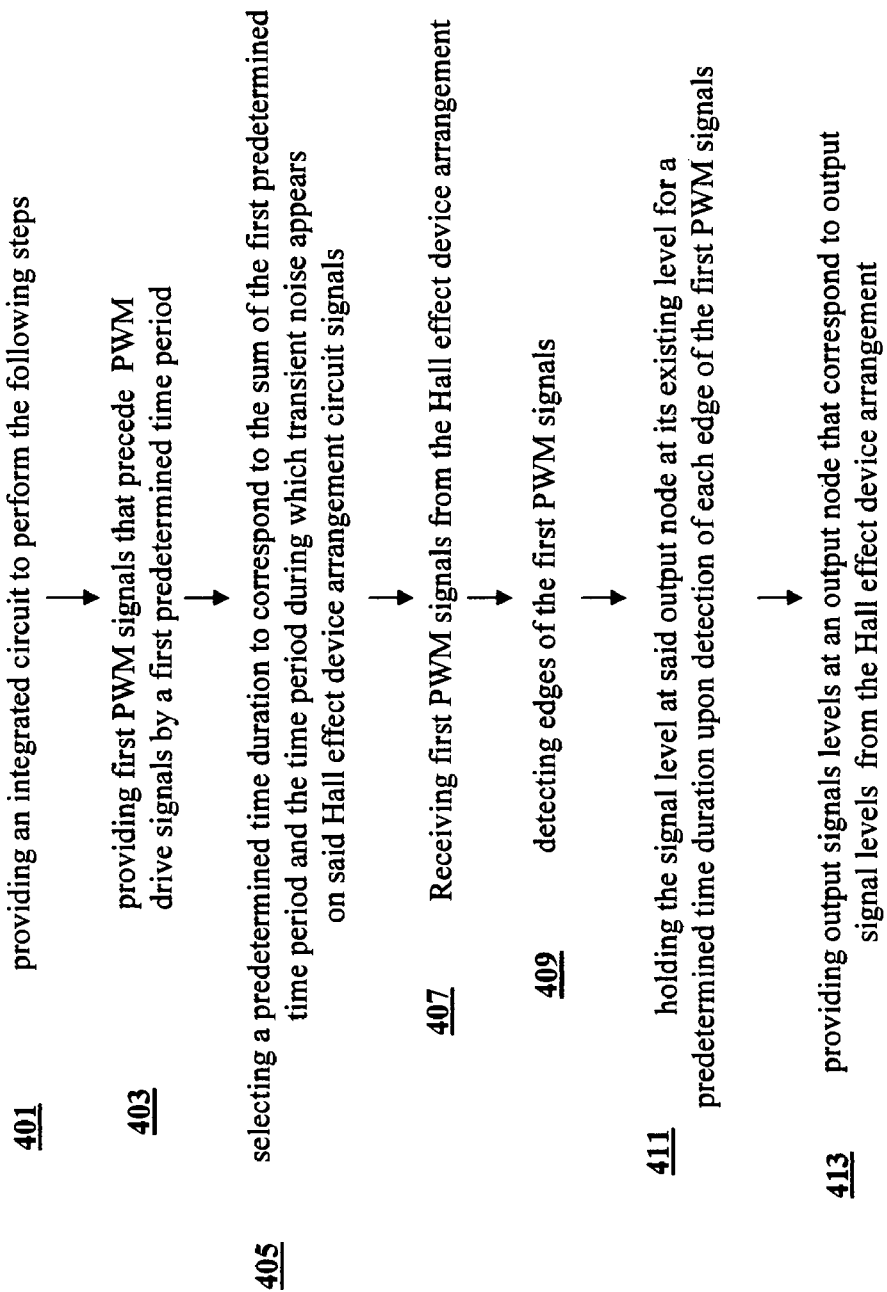
FIG. 4 illustrates the method of the invention.

Turning to FIG. 4, the method by which the apparatus of the illustrative embodiment eliminates the PWM induced noise is illustrated. At step 401, an integrated circuit is provided to perform the following steps: providing first PWM signals that precede PWM drive signals by a first predetermined time period at step 403; selecting a predetermined time duration to correspond to the sum of the first predetermined time period and the time period during which transient noise appears on the Hall effect device arrangement circuit signals at step 405; receiving first PWM signals from the Hall effect device arrangement at step 407; detecting edges of the first PWM signals at step 409; holding the signal level at the output node at its existing level for a predetermined time duration upon detection of each edge of the first PWM signals at step 411; and providing output signals levels at an output node that correspond to output signal levels from the Hall effect device arrangement at step 413.

Figure 5:
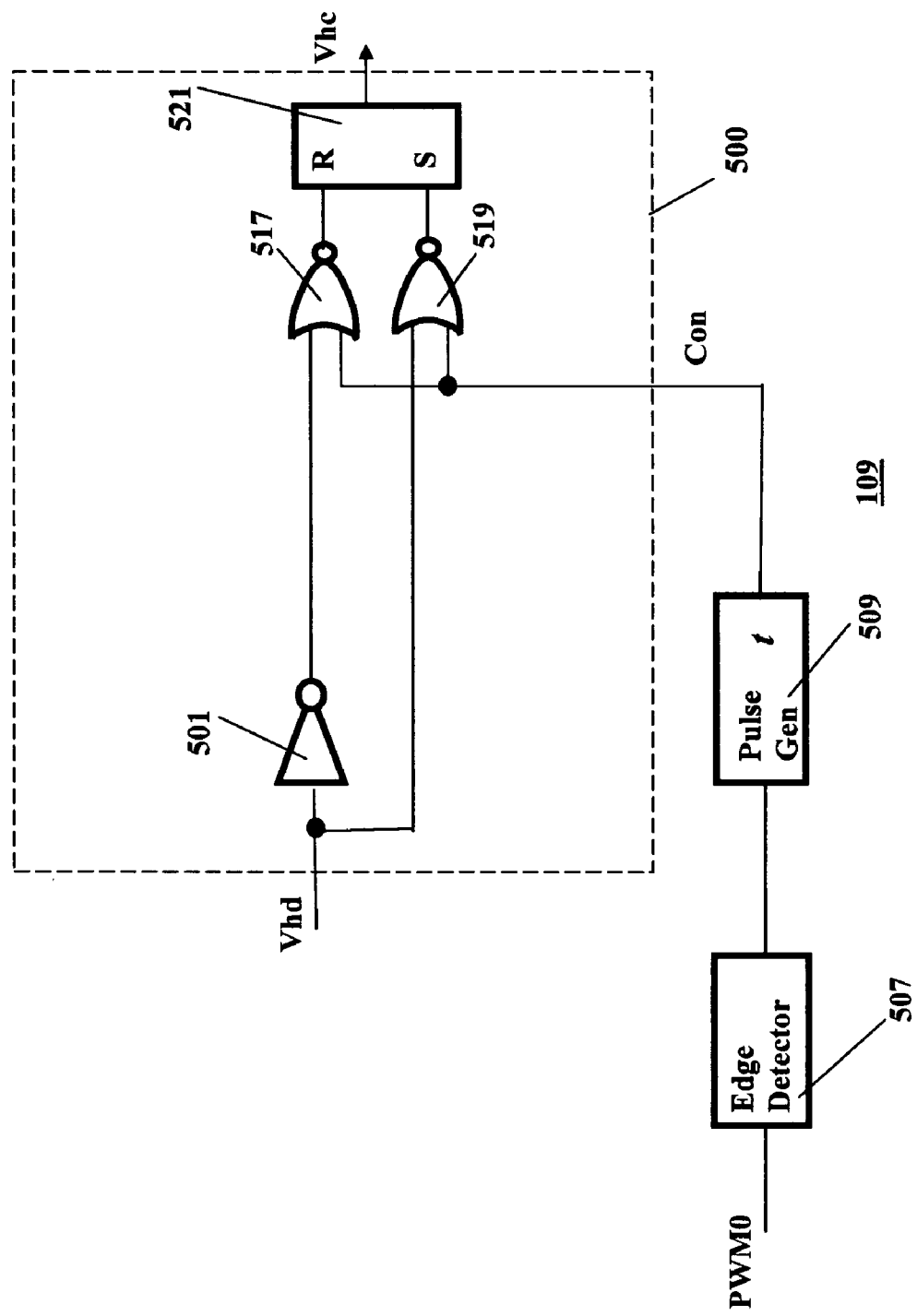
FIG. 5 is a diagram illustrating the noise suppression block of FIG. 1 in greater detail.

The methodology of FIG. 4 is carried out by the noise suppression circuit 109 of the illustrative embodiment shown in FIG. 5.

Noise suppression circuit 109, as noted above is formed on an integrated circuit 100 as illustrated in FIG. 1. Noise suppression circuit 109 receives as inputs the Hall arrangement output signal Vhd and the signal PWM0 from circuit 103. Noise suppression circuit 109 provides as an output a clean output signal Vhc.

An edge detector circuit 507 receives signal PWM0 and provides an output on each edge 212, 214 of the pulses of PWM0. The output of edge detector 507 is coupled to a pulse generator 509. The output of pulse generator 509 provides a pulse output that represents a time period "t" that is sufficiently long so as to extend beyond the time period during which noise spikes 223 occur on the Hall arrangement output signal Vhd.

Latch circuit 521 receives the hall sensor output signal Vhd and its logic complement and combines those signals with the time delay signal from pulse generator 509 which is coupled to gates 517, 519 to control latch 521.

A motor circuit 100 is provided for use with a monolithic brushless DC motor M having a Hall effect device arrangement 105 coupled to the monolithic brushless DC motor. The Hall effect device arrangement 105 provides signals indicative of the rotational position and speed of the motor. Motor circuit 100 includes a motor drive PWM circuit 103, that is coupleable to motor M. PWM circuit 103 provides a first PWM signal PWM0 and second PWM signals PWMd. First PWM signals PWM0 precede the second PWM signals PWMd by a predetermined first time period 203. Motor circuit 100 includes an edge detector circuit 507 having an input node coupleable to the PWM circuit to receive the first PWM signal PWM0. Edge detector circuit 507 has an output node, and the edge detector provides an edge indicating signal at the output node whenever the first PWM signal PWM0 transitions between two states. A pulse generating circuit or time delay circuit 509 has an input node coupled to the edge detector circuit 507 output node. Time delay or pulse generating circuit 509 has an output node and is responsive to each edge indicating signal to provide a pulse signal at the output node. The pulse signal has a predetermined time duration t selected to be greater than the predetermined first time period 203 and the time period of noise spikes generated by the second PWM signals. Inverter 501, gates 517, 519 and latch 521 form a sampling circuit 500. The output node of time delay or pulse generator circuit 509 is coupled to the sampling circuit 500 sample control input node Con. Sampling circuit 500 provides an output signal Vhc at the output node having a level that follows the level of the signal Vhd at the sampling circuit input node. Sampling circuit 500 holds the signal level Vhc at the output node during the time duration that the pulse signal is present at the sample control input node Con.

The invention has been described in conjunction with illustrative embodiments. It will be appreciated by those skilled in the art that various changes may be made to the embodiments shown and described without departing from the spirit or scope of the invention.

It is not intended that the invention be limited in any manner to the specific embodiments shown and described. It is intended that the invention only be limited by the claims appended hereto.

What is claimed is:

1. A motor circuit for use with a monolithic brushless DC motor having a Hall effect device circuit coupled to said monolithic brushless DC motor, said Hall effect device circuit providing signals indicative of the rotational position and speed of said motor, said motor circuit comprising:

a sampling circuit comprising one or more input nodes coupled to said Hall effect device circuit, a sample control input node, and an output node;

a motor drive PWM circuit, said PWM circuit having a first output node and having second output nodes coupleable to said motor, said PWM circuit providing a first PWM signal at said first output node and second PWM signals at said second output nodes, said first PWM signal preceding said second PWM signals by a predetermined first time period;

an edge detector circuit having an input node coupleable to said PWM circuit first output node to receive said first PWM signal, said edge detector circuit having an output node, said edge detector providing an edge indicating signal at said output node whenever said first PWM signal transitions between two states;

a pulse generating circuit having an input node coupled to said edge detector circuit output node, said pulse generating circuit having an output node, said pulse generating circuit responsive to each said edge indicating signal to provide a pulse signal at said output node, said pulse signal having a predetermined time duration, said predetermined time duration being selected to be greater than said predetermined first time period and the time period of noise spikes generated by said second PWM signals, said output node of said pulse generating circuit coupled to said sampling circuit sample control input node; and said sampling circuit providing an output signal at said output node having a level that follows the signal level at said sampling circuit input node, said sampling circuit holding the signal level at said output node during said time duration that said pulse signal is present at said sample control input node.

2. A motor circuit in accordance with claim 1, comprising:
a single substrate, said substrate comprising said sampling circuit, said edge detector circuit, and said pulse generating circuit formed thereon.

3. A motor circuit in accordance with claim 2, wherein:
said single substrate comprises said motor drive PWM circuit formed thereon.

4. A motor circuit for use with a monolithic brushless DC motor having a Hall effect device circuit coupled to said monolithic brushless DC motor, said Hall effect device circuit providing signals indicative of the rotational position and speed of said motor, said motor circuit comprising:
a sample and hold circuit having one or more input nodes coupled to said Hall effect device circuit, a control input node, and an output node;
a motor drive PWM circuit, said PWM circuit having a first output node and having second output nodes coupleable to said motor, said PWM circuit providing a first PWM signal at said first output nodes and second PWM signals at said second output nodes, said first PWM signal preceding said second PWM signals by a predetermined first time period;
an edge detector circuit having an input node coupleable to said PWM circuit first output node to receive said first PWM signal, said edge detector circuit having an output node, said edge detector providing an edge indicating signal at said output node whenever said first PWM signal transitions between two states;
a pulse generating circuit having an input node coupled to said edge detector circuit output node, said pulse generating circuit having an output node, said pulse generating circuit responsive to each said edge indicating signal to provide a pulse signal at said output node, said pulse signal having a predetermined time duration, said predetermined time duration being selected to be greater than said predetermined first time period and the time period of noise spikes generated by said second PWM signals, said output node of said pulse generating circuit coupled to said sampling circuit sample control input node; and
said sample and hold circuit providing an output signal at said output node having a level that follows the signal level at said sample and hold circuit one or more input nodes, said sample and hold circuit holding said level of said output signal at said output node during said time duration that said pulse signal is present at said control input node.

5. A motor circuit in accordance with claim 4, comprising:
a single substrate, said substrate comprising said sample and hold circuit, said edge detector circuit, and said pulse generating circuit formed thereon.

6. A motor circuit in accordance with claim 5, wherein:
said single substrate comprises said motor drive PWM circuit formed thereon.

7. A motor circuit for use with a monolithic brushless DC motor having a Hall effect device coupled to said monolithic brushless DC motor, said Hall effect device having differential output nodes, said Hall effect device providing differential signals at said output nodes indicative of the rotational position and speed of said motor, said circuit comprising:
an amplifier coupled to said Hall effect output nodes, said amplifier having an output node;
a sampling circuit having an input node coupled to said amplifier output node, a sample control input node, and an output node;
a motor drive PWM circuit, said PWM circuit having a first output node and having second output nodes coupleable to said motor, said PWM circuit providing a first PWM signal at said first output nodes and second PWM signals at said second output nodes, said first PWM signal preceding said second PWM signals by a predetermined first time period;
an edge detector circuit having an input node coupleable to said PWM circuit first output node to receive said first PWM signal, said edge detector circuit having an output node, said edge detector providing an edge indicating signal at said output node whenever said first PWM signal transitions between two states;
a pulse generating circuit having an input node coupled to said edge detector circuit output node, said pulse generating circuit having an output node, said pulse generating circuit responsive to each said edge indicating signal to provide a pulse signal at said output node, said pulse signal having a predetermined time duration, said predetermined time duration being selected to be greater than said predetermined first time period and the time period of noise spikes generated by said second PWM signals, said output node of said pulse generating circuit coupled to said sampling circuit sample control input node; and
said sampling circuit providing an output signal at said output node having a level that follows the signal level at said sampling circuit input node, said sampling circuit holding the signal level at said output node during said time duration that said pulse signal is present at said sample control input node.

8. A motor circuit in accordance with claim 7, comprising:
a single substrate, said substrate comprising said amplifier, said sampling circuit, said edge detector circuit, and said pulse generating circuit each formed thereon.

9. A motor circuit in accordance with claim 8, wherein:
said single substrate comprises said motor drive PWM circuit formed thereon.

10. A method of processing signals for a Hall effect device circuit coupled to a monolithic brushless DC motor, said motor being driven by a PWM circuit providing PWM drive signals to said motor, said method comprising:
receiving signals from said Hall effect device circuit;
providing output signals levels at an output node that correspond to output signal levels from said Hall effect device circuit;
providing first PWM signals that precede said PWM drive signals by a first predetermined time period;
detecting edges of said first PWM signals;
holding the signal level at said output node at its existing level for a predetermined time duration upon detection of each edge of said first PWM signals.

11. A method in accordance with claim 10, comprising:
selecting said predetermined time duration to correspond to the sum of said predetermined time period and the time period during which transient noise appears on said Hall effect device circuit signals.

12. A method in accordance with claim 11, comprising:
providing an integrated circuit to perform said receiving signals step, said providing output signals step, said detecting edges step, and said signal holding step.

13. A method in accordance with claim 11, comprising:
providing an integrated circuit to perform said receiving signals step, said providing output signals step, said detecting edges step, said providing said first PWM signals step, and said signal holding step.

* * * * *